(12) United States Patent
Karpik et al.

(10) Patent No.: US 6,237,706 B1
(45) Date of Patent: *May 29, 2001

(54) VEHICLE SUSPENSION SYSTEM WITH VARIABLE GEOMETRY

(75) Inventors: Gerard J. Karpik; David J. Karpik, both of Eveleth; Scott A. Miers; Michael A. Lehman, both of Virgina, all of MN (US)

(73) Assignee: Fast Action Support Team, Inc., Eveleth, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/483,968

(22) Filed: Jan. 18, 2000

Related U.S. Application Data

(63) Continuation of application No. 08/853,442, filed on May 6, 1997, now Pat. No. 6,032,752.

(51) Int. Cl.⁷ .................................................. B62D 55/104
(52) U.S. Cl. .......................................... 180/9.52; 180/193
(58) Field of Search .................................. 180/9.52, 190, 180/193; 305/131

(56) References Cited

U.S. PATENT DOCUMENTS

| 3,115,945 | 12/1963 | Dry et al. ................................. 180/56 |
| 3,527,505 | 9/1970 | Hetteen ..................................... 305/27 |
| 3,637,265 | 1/1972 | Valentine et al. .......................... 305/24 |
| 3,658,392 | 4/1972 | Perreault et al. .......................... 305/24 |
| 3,711,164 | 1/1973 | Chaumont .................................. 505/24 |
| 3,721,308 | 3/1973 | Brandl et al. ............................. 180/193 |
| 3,727,709 | 4/1973 | Newman ................................. 180/9.54 |
| 3,744,583 | 7/1973 | Bedard .................................. 180/9.58 |
| 3,788,412 | 1/1974 | Vincent .................................. 180/193 |
| 3,879,092 | 4/1975 | Rose ...................................... 205/127 |
| 3,913,693 | 10/1975 | Hale et al. ............................. 180/193 |
| 3,913,694 | 10/1975 | Forsgren ................................ 305/128 |
| 3,933,213 | 1/1976 | Trowbridge ............................ 180/193 |
| 3,944,005 | 3/1976 | Tomita ................................... 180/193 |
| 3,945,663 | 3/1976 | Duckett ............................... 280/6.159 |
| 3,966,151 | 6/1976 | Hawkins, III . |
| 3,966,181 | 6/1976 | Lessard . |
| 4,057,916 | 11/1977 | Roemer . |
| 4,131,266 | 12/1978 | Carter . |
| 4,222,453 | 9/1980 | Fixsen et al. . |

(List continued on next page.)

FOREIGN PATENT DOCUMENTS

| 895747 | 3/1972 | (CA) . |
| 942802 | 2/1974 | (CA) . |
| 944001 | 3/1974 | (CA) . |
| 956674 | 10/1974 | (CA) . |
| 994395 | 8/1976 | (CA) . |
| 1026807 | 2/1978 | (CA) . |
| 1029425 | 4/1978 | (CA) . |
| 850110 | 7/1986 | (FI) . |
| 901451 | 9/1991 | (FI) . |
| 1035475 | 4/1953 | (FR) . |

Primary Examiner—Robert P. Olszewski
Assistant Examiner—Michael Cuff
(74) Attorney, Agent, or Firm—Faegre & Benson LLP

(57) ABSTRACT

A vehicle suspension system with a variable geometry. A moveable suspension arm is pivotally attached to a vehicle chassis. A biasing/dampening mechanism is operatively attached to the vehicle chassis at a first end. An actuator mechanism operatively connects the second end of the biasing/dampening mechanism to the moveable suspension arm. The actuator mechanism has a mechanism for moving the second end along at least one axis when the vehicle is in a static or dynamic mode to increase or decrease the motion ratio or displacement of the biasing/dampening mechanism to the total displacement of the suspension system relative to the vehicle chassis. A control mechanism is provided for activating the actuator mechanism.

26 Claims, 8 Drawing Sheets

U.S. PATENT DOCUMENTS

| | | |
|---|---|---|
| 4,226,408 | 10/1980 | Tomita et al. . |
| 4,311,302 | 1/1982 | Heyer et al. . |
| 4,407,386 | 10/1983 | Yasui et al. . |
| 4,411,342 | 10/1983 | Katsumori et al. . |
| 4,442,926 | 4/1984 | Muto . |
| 4,518,056 | 5/1985 | Kobayashi . |
| 4,700,815 | 10/1987 | Persicke et al. . |
| 4,756,517 | 7/1988 | Kakimoto . |
| 4,843,293 | 6/1989 | Futami . |
| 4,895,383 | 1/1990 | Abe et al. . |
| 4,911,466 | 3/1990 | Blair . |
| 4,987,965 | 1/1991 | Bourrert . |
| 5,086,861 | 2/1992 | Peterson . |
| 5,094,472 | 3/1992 | Oyama et al. . |
| 5,172,786 | 12/1992 | Ishibashi . |
| 5,199,401 | 4/1993 | O'Neil et al. . |
| 5,265,692 | 11/1993 | Mallette . |
| 5,270,625 | 12/1993 | Neff . |
| 5,333,989 | 8/1994 | Missana et al. . |
| 5,353,902 | 10/1994 | Flowtow et al. . |
| 5,370,198 | 12/1994 | Karpik . |
| 5,450,202 | 9/1995 | Tisue . |
| 5,667,031 | 9/1997 | Karpik . |
| 5,881,834 | 3/1999 | Karpik . |
| 6,032,752 * | 3/2000 | Karpik et al. ............... 180/9.52 |

* cited by examiner

VEHICLE SUSPENSION SYSTEM WITH VARIABLE GEOMETRY

This is a continuation of prior application Ser. No. 08/853,442, filed May 6, 1997 is now U.S. Pat. No. 6,032,752.

FIELD OF THE INVENTION

The present invention relates to a method and apparatus for adjusting the range of calibration of a vehicle suspension system with respect to comfort, control, and load capacity from a remote location on the vehicle, and in particular, to a method and apparatus for dynamically changing the motion ratio of the biasing/dampening mechanism relative to the suspension system.

BACKGROUND OF THE INVENTION

Numerous types of vehicles are used for traveling over a variety of surfaces. For example, all terrain vehicles and snowmobiles may be used to traverse smooth roads, small to medium bumps, very large bumps, and frozen or unfrozen terrain all in a single excursion. To obtain the optimum ride quality for each set of conditions, a different ratio of travel between the vehicle and the biasing mechanism on the suspension system is required. The ratio of shock absorber and/or spring displacement divided by the total vertical displacement of the suspension system relative to the vehicle chassis at a selected location (hereinafter referred to as motion ratio) for optimum ride control varies greatly depending on the terrain conditions and speed at which the vehicle is traveling.

The importance of a proper motion ratio can be illustrated by the snowmobile 10 of FIG. 1. The snowmobile 10 has a body frame or chassis 12 that mounts a seat 14 on an upper side thereof Seated on the snowmobile seat 14, the driver manually steers the vehicle 10 by a handlebar assembly 18 that is secured to a steering shaft 20 that extends through a compartment 22 for the internal combustion engine 24. The steering shaft 20 is operatively connected to a pair of steerable skis 28 through a steerable linkage preferably arranged so that the inside cornering ski 28 turns at a greater angle than the outside ski 28 so as to provide comfortable steering.

An endless track 16 driven by a main drive wheel 40 operatively connected to the internal combustion engine 24 rotates around a suspension system 26. The suspension system 26 includes a slide rail 30 connected to the chassis 12 by a front suspension arm 32 and a rear suspension arm 34. At least one biasing/dampening mechanism 36 is provided for biasing the slide rail 30 away from the chassis 12. In the embodiment illustrated in FIG. 1, lower end 38 of the rear biasing/dampening mechanism 36, is pivotally connected to the slide rail 30 through a mechanical adjustment mechanism (not shown) to provide for adjusting the location of the lower end 38 over a distance, and thus, adjusting the motion ratio. In one embodiment, adjustment of the lower end 38 is made within a slot 42.

There is no easy way to adjust the motion ratio for a specific terrain without stopping the vehicle and manually making the adjustment. For example, in the context of the snowmobile of FIG. 1, the driver may move from a smooth, groomed trail to a very rough terrain. If the suspension has been delivering optimum ride quality on the smooth trail, the motion ratio may need to be increased to provide optimum ride quality on the rough terrain. For example, the vehicle will periodically bottom out at lower speeds than would otherwise be able to be maintained with a proper motion ratio. The driver is faced with a choice of either stopping the snowmobile and crawling under the chassis to make the adjustment or enduring the consequences of a less than optimum motion ratio.

A smooth and controlled ride over varied terrain is one of the most important handling qualities of snowmobiles, as well as a variety of other recreational vehicles. The suspending forces of the vehicle suspension system with regard to any bumps is directly affected by the speed of the shock absorber as well as the displacement of the biasing/dampening mechanism. Both of these factors are controlled by the motion ratio. The higher the motion ratio, the greater the resistance of the suspension system to vertical displacement during compression travel. The lower the motion ratio, the less resistance provided by the suspension system to vertical displacement on compression travel. All other parameters remaining the same, a motion ratio that is high enough to withstand bottoming of the chassis against the suspension system in rough terrain with large bumps will also deliver a rough, less comfortable ride on smoother terrain. In the opposite conditions, a motion ratio low enough to deliver a comfortable ride on smooth terrain will periodically bottom out on rough terrain.

U.S. Pat. No. 3,115,945 illustrates a chassis support apparatus having a pivotally mounted cushion cylinders that may be adjusted more and less vertical to adjust for heavy or light loads. The cushion cylinders are pivotally attached to a moveable pivot block that is engaged with a threaded transverse member rigidly mounted to the frame. Consequently, the adjustment mechanism is located on the frame.

SUMMARY OF THE INVENTION

The present invention relates to a method and apparatus for increasing the range of a suspension system's ride calibration with respect to comfort, control, and load capacity from a remote location on the vehicle through changing the motion ratio of one or more components of the vehicle suspension system.

In one embodiment, the present method and apparatus provide a change in the motion ratio of a biasing/dampening mechanism to the vehicle on a suspension system under the vehicle. Altering the motion ratio changes the speed and/or displacement of the biasing/dampening mechanism, and hence, altering the stiffness with which the suspension system isolates the vehicle from the terrain.

The vehicle suspension system with a variable geometry comprises a moveable suspension arm pivotally attached to a vehicle chassis. A biasing/dampening mechanism is operatively attached to the vehicle chassis at a first end. An actuator mechanism operatively connects the second end of the biasing/dampening mechanism to the moveable suspension arm. The actuator mechanism has means for moving the second end along at least one axis when the vehicle is in a static or dynamic mode to increase or decrease the motion ratio of the biasing/dampening mechanism relative to the moveable suspension arm. A control mechanism is provided for activating the actuator mechanism. The actuator mechanism is capable of increasing or decreasing the motion ratio of the biasing/dampening mechanism relative to the total displacement of the suspension system relative to the chassis.

In one embodiment, the actuator mechanism is pivotally connected to the moveable suspension arm. The actuator mechanism may be operatively connected to the second end of the biasing/dampening mechanism by a rocker arm and a pull rod. Consequently, it is possible to indirectly move the location of the second end of the biasing/dampening mechanism to the moveable suspension arm. The biasing/dampening mechanism may be a shock absorber and/or spring.

A sensor may be provided for sensing the location of the second end of the biasing/dampening mechanism when the vehicle is in the static or dynamic mode. A display is preferably provided for indicating the location of the second end of the biasing/dampening mechanism.

The actuator mechanism may be a hydraulic ram or a motor driven linkage mechanism. In one embodiment, the actuator mechanism comprises a mechanical linkage for displacing the second end of the biasing/dampening mechanism and an electric motor coupled to the mechanical linkage.

The electric motor may be connected in series to an electrical system on the vehicle. In one embodiment, a first power converter converts alternating current from the electric power source on the vehicle to direct current prior to the electric motor. A second power converter converts direct current from the motor to alternating current. The alternating current from the second power converter is directed back to the electrical system on the vehicle.

In one embodiment, the suspension system with a variable geometry suspends an endless track beneath a tracked vehicle. The suspension assembly has an elongated slide rail with a bottom track engaging portion defining a longitudinal axis. At least one suspension arm pivotally connects the vehicle chassis with the slide rail. A biasing/dampening mechanism urges the slide rail away from the vehicle chassis. The biasing/dampening mechanism has a first end operatively connected to the vehicle chassis at a first location and a second end operatively connected to the slide rail at a second location. An actuator mechanism operatively connects the second end of the biasing/dampening mechanism to the slide rail. The actuator mechanism includes means for moving the second end along at least one axis when the vehicle is in a static or dynamic mode to increase or decrease the motion ratio of the displacement of the biasing/dampening mechanism relative to the displacement of the slide rail. A control mechanism is provided for activating the actuator mechanism. The control mechanism may be a simple switch or a programmable logic controller activated by the rider.

The present invention is also directed to a method for adjusting the geometry of a suspension system on a vehicle. A moveable suspension arm is pivotally attached to a vehicle chassis. A biasing force is applied between the chassis and a first location on the moveable suspension arm using a biasing/dampening mechanism. A control mechanism signals the activation of an actuator mechanism when the vehicle is in a static or dynamic mode, whereby the location where the biasing force engages with the moveable suspension arm is displaced to a second location and the motion ratio of the biasing force to the moveable suspension arm is increased or decreased.

The vehicle may be a snowmobile, an all-terrain vehicle or a motor cycle.

The present invention is also directed to a method for powering an accessory using an electric power source in a vehicle's electric system. Unregulated alternating current up to a selected voltage level from the electric power source on the vehicle is converted to direct current. The direct current is directed to the accessory in series with the electric power source on the vehicle. Direct current from the accessory is converted to alternating current. The alternating current from the accessory is directed to the electric system on the vehicle. The accessory may be an electric motor, fuel injection system or a variety of other components.

Motion Ratio refers to the ratio of the displacement of a biasing/dampening mechanism (shock, damper and/or spring) divided by the total displacement of the suspension system relative to the vehicle chassis at a selected location.

DETAILED DESCRIPTION OF THE INVENTION

Figure 1:
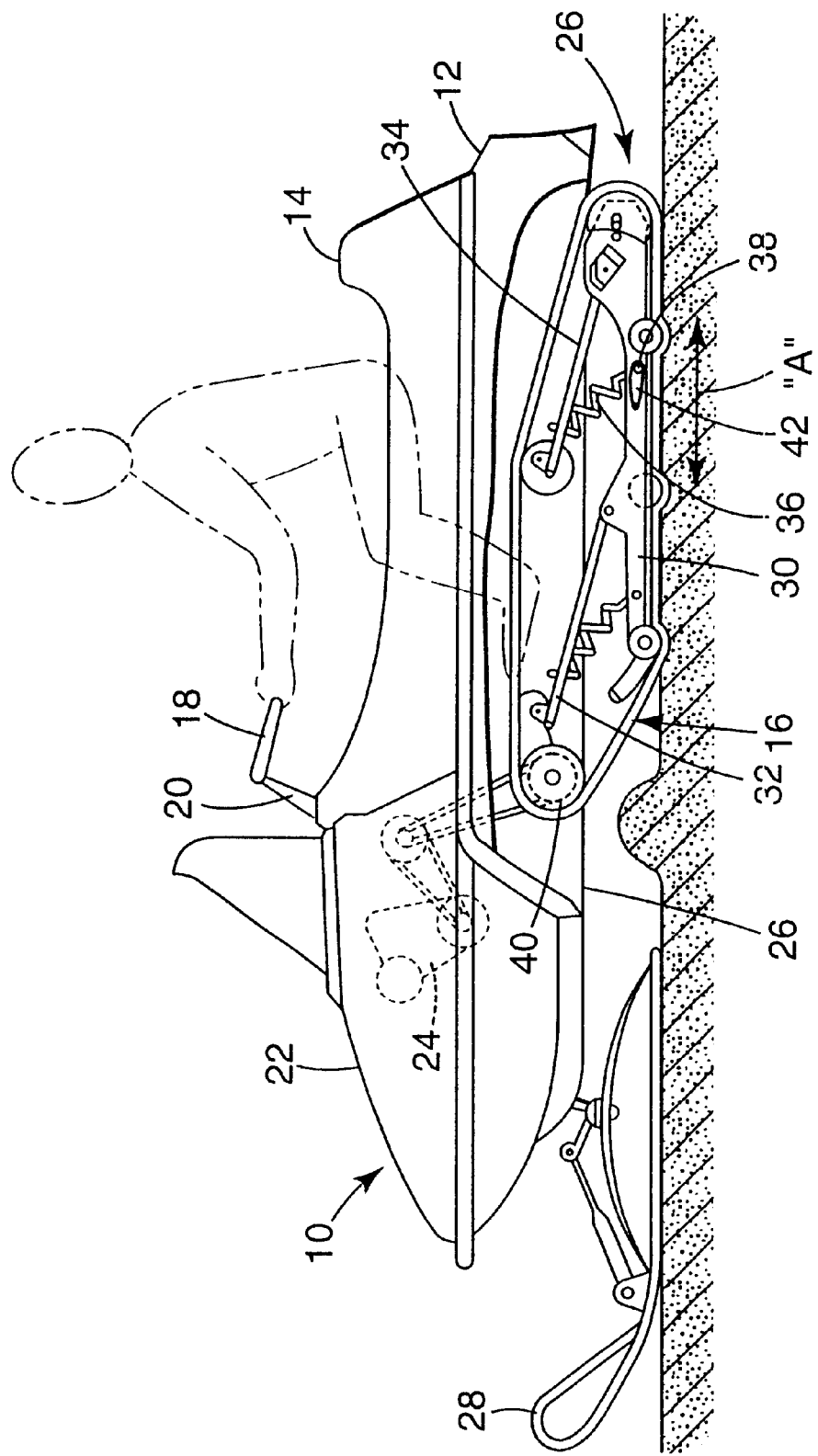
FIG. 1 is a side view of a prior art suspension system for a snowmobile.
Figure 2:
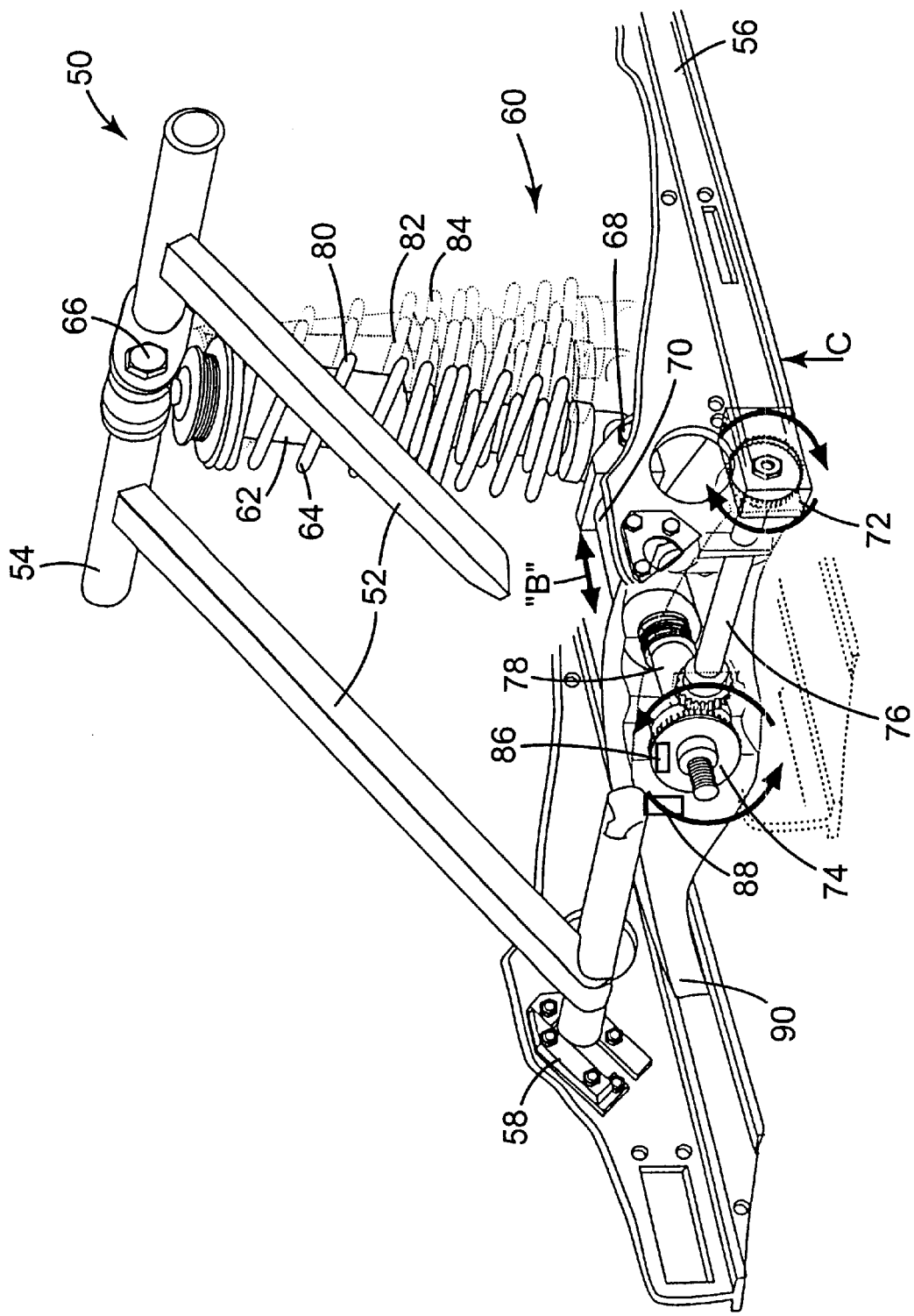
FIG. 2 is a perspective view of an exemplary suspension system according to the present invention.

FIG. 2 is a perspective view of an exemplary suspension system 50 according to the present invention. Although the suspension system 50 of FIG. 2 is configured for use on a snowmobile, it will be understood that the present invention may be utilized on a wide variety of recreational vehicles and that the embodiment of FIG. 2 is for illustration purposes only.

The suspension system 50 generally includes a pair of suspension arms 52 connected to a vehicle chassis (not shown) at an upper end 54. The upper end 54 preferably is pivotally attached either directly to the vehicle chassis or through additional linkage. The lower end of the suspension arms 52 are engaged with a slide rail 56 through a slide block linkage mechanism 58. Various slide block linkage mechanisms are further discussed in U.S. Pat. Nos. 5,370,198 (Karpik) and U.S. Pat. No. 5,265,692 (Mallette).

The slide rail 56 is biased away from the upper end 54 of the suspension arms 52 by a biasing/dampening mechanism 60, The biasing/dampening mechanism 60 is pivotally mounted at a pivot joint 66 to the upper end 54. The lower end of the biasing/dampening mechanism 60 is pivotally mounted at a pivot joint 68 attached to an actuator arm 70.

The biasing/dampening mechanism in the present embodiment includes a shock absorber 62 and a spring 64, although either component may be used without the other to form the biasing/dampening mechanism. Each component behaves differently to displacement. The spring 64 is displacement sensitive. For example, a spring may provide resistance of 100 lbs. for each inch of displacement. By increasing or decreasing the motion ratio of the spring relative to the suspension system, the amount the spring is displaced for a given displacement of the suspension system 50 may be adjusted.

The shock absorber 62 is primarily speed sensitive. That is, the resistance provided by the shock absorber increases with the speed at which the shock absorber is displaced. In the case of fluid-based shock absorbers, drag of the fluid is proportional to velocity of the fluid squared so that the force versus velocity relationship of the shock absorber is parabolic. Doubling the displacement speed quadruples the resistance of the shock absorber. Shock absorbers tend to be more effective (provide greater resistance) at higher speeds. At a high motion ratio, the shock absorber is displaced over a greater length for a given vertical compression of the suspension system and hence its operational speed is increased with a corresponding increase in resistance. Similarly, at a lower motion ratio, the shock absorber is displaced over a shorter length for the same vertical displacement of the suspension system, and hence its operational speed is decreased with a corresponding decrease in resistance. Therefore, the present suspension system 50 with variable geometry is capable of adjusting both the speed of the shock absorber and the displacement of the spring.

A motor 72 is located along one side of the slide rail 56. The motor 72 is connected to a bevel gear drive 74 by a drive shaft 76. The bevel gear drive 74 is operatively connected to a threaded member 78 which engages the mating threaded portion of the actuator arm 70. Rotation of the motor 72 causes the actuator arm 70 to move along the axis B. The actuator arm 70 and/or housing 90 are preferably beveled at their respective intersection locations to minimize accumulation of ice or debris. The motor preferably provides about 7.1 newton-meters to about 10.5 newton-meters of torque at 10 revolutions per minute, when the specified voltage and current are supplied. A suitable motor is a Bosch part no. 9000016040 available from Chief Enterprises located in Elmhurst, Ill. A variety of actuator mechanisms, such as hydraulic or pneumatic cylinders, may alternatively be used. Various actuators are disclosed in U.S. Pat. Nos. 4,756,517 (Kakimoto), 4,895,383 (Abe et al.), U.S. Pat. No. 4,911,466 (Blair), and U.S. Pat. No. 5,094,472 (Oyama et al.).

Movement of the actuator arm 70 along the axis B changes the motion ratio of the suspension system 50. When the actuator arm 70 is in its most retracted position (closest to the bevel gear drive 74), the suspension system 50 is in a low motion ratio or soft configuration 80. The biasing/dampening mechanism 60 will be at its lowest speed and displacement in the low motion ratio configuration 80. As the actuator arm 70 extends away from the bevel gear drive 74, the suspension system 50 moves through an intermediate motion ratio configuration 82 to a high motion ratio configuration 84. In the high motion configuration 84, the biasing/dampening mechanism is in its maximum speed and displacement. As discussed above, the configuration 84 provides the suspension system 50 with a high motion ratio when subjected to an input force C. The configuration 80 provides less resistance to vertical displacement of the suspension system 50 (low motion ratio) to the input force C.

Moving the lower end of the biasing/dampening mechanism 60 provides a greater change of mechanical advantage to the suspension system 50 than would be realized if the upper end were moved. That is, the greatest change in the motion ratio is effectuated by locating the moving end of the biasing/dampening mechanism on the slide rail, swing arm or other moving member. For example, the present actuator arm 70 has a range of motion of about 33 mm (1.3 inches), corresponding to a change of 7.3 cm (2.87 inches) in the vertical travel of the slide rail 56.

The bevel gear drive 74 preferably includes an indicator, such as a magnet 86, that is detectable by a detector 88 mounted to a housing 90 containing the bevel gear drive 74 and threaded member 78. Control electronics 92 (see FIG. 7) is preferably a programmable logic controller for monitoring the detector 88 and counting the rotations of the bevel gear drive 74 so that the position of the actuator arm 70 can be displayed to the driver via a display 94 to the rider. A simple switch may be used in place of the control electronics 92. A linear variable displacement transducer or a variety of other device may be used to sense the position of the actuator arm 70.

In the event the control electronics 92 does not receive a pulse from the detector 88 for some period of time during which the motor 72 has been activated, the control electronics 92 assumes that the actuator arm 70 has reached a limit to its physical range of motion and subsequently terminates the power to the motor 72. Similarly, if movement of the actuator arm 70 is blocked by ice or another obstruction, the control electronics 92 will sense the lack of movement and signal an error to the rider via the display device 94 and terminate the power to the motor 72. Non-volatile memory is provided to store the last position until the vehicle is started again.

Figure 3:
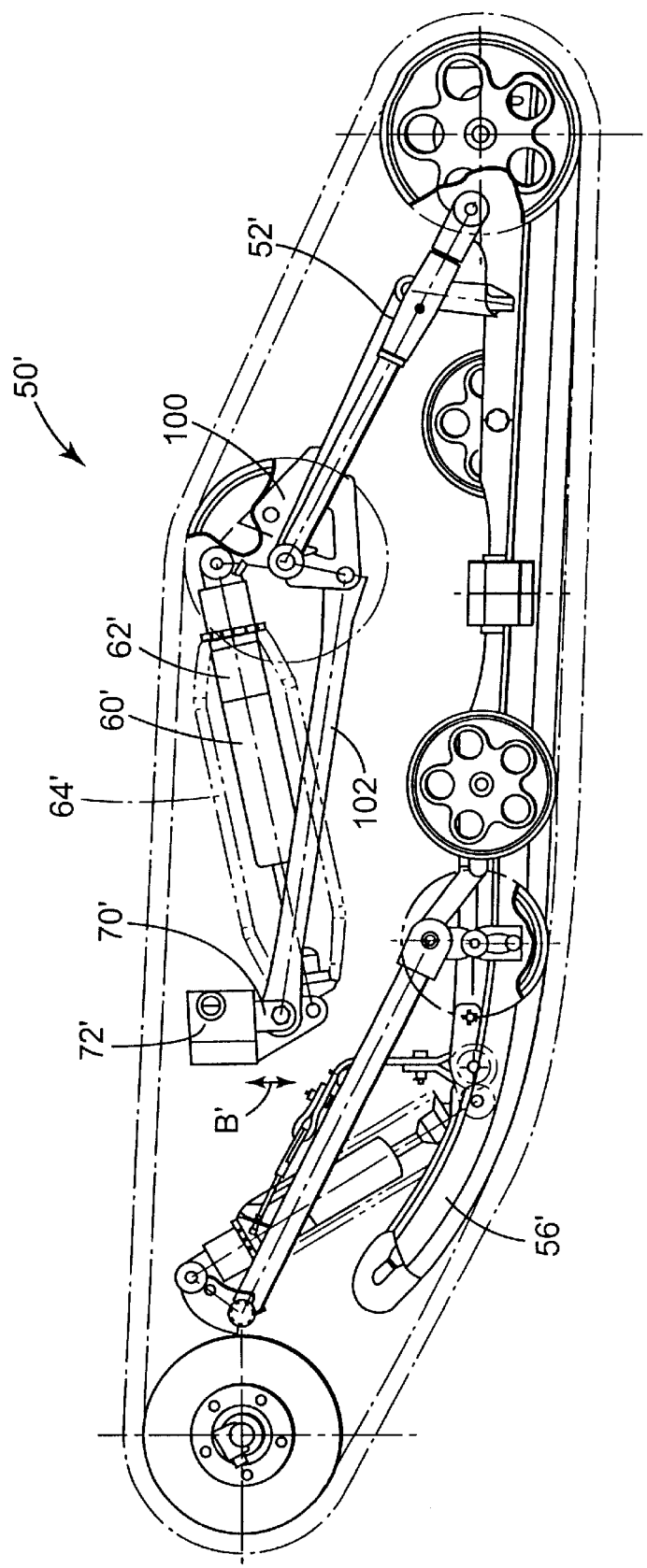
FIG. 3 is a side view of an alternate snowmobile suspension system according to the present invention.

FIG. 3 is a schematic illustration of an alternate snowmobile suspension system 50' according to the present invention. Suspension arm 52' pivotally connects slide rail 56' to a rocker arm 100. The top edge of the rocker arm 100 is pivotally connected to a biasing/dampening mechanism 60'. The biasing/dampening mechanism 60' may be a shock absorber 62' and/or a spring 64'. The other end of the biasing/dampening mechanism 60' is pivotally mounted to the chassis (not shown) through another rocker arm of the snowmobile. The lower end of the rocker arm 100 is pivotally mounted to a pull rod 102. The other end of the pull rod 102 is pivotally engaged with the actuator arm 70' on the actuator 72', such as the motor described in FIG. 2. The actuator arm 70' moves along an axis B so as to displace the pull rod 102'. Extending the actuator arm 70' causes the pull rod 102' to rotate the rocker arm 100 in a counterclockwise direction. Retraction of the actuator arm 70' rotates the rocker arm 100 in a clockwise direction. This rotational variation increases or decrease the speed and displacement of the biasing/dampening mechanism 60'. Increasing the speed and displacement of the biasing/dampening mechanism 60' corresponds to a higher motion ratio configuration and a stiffening of the suspension system 50'. Similarly, retraction of the actuator arm 70' causes the rocker arm 100 to rotate in a clockwise direction and the speed and displacement of the biasing/dampening mechanism 60' to be increased. Decreasing the speed and displacement of the biasing/dampening mechanism 60' corresponds to a lower motion ratio and a softer ride on the vehicle.

Figure 4:
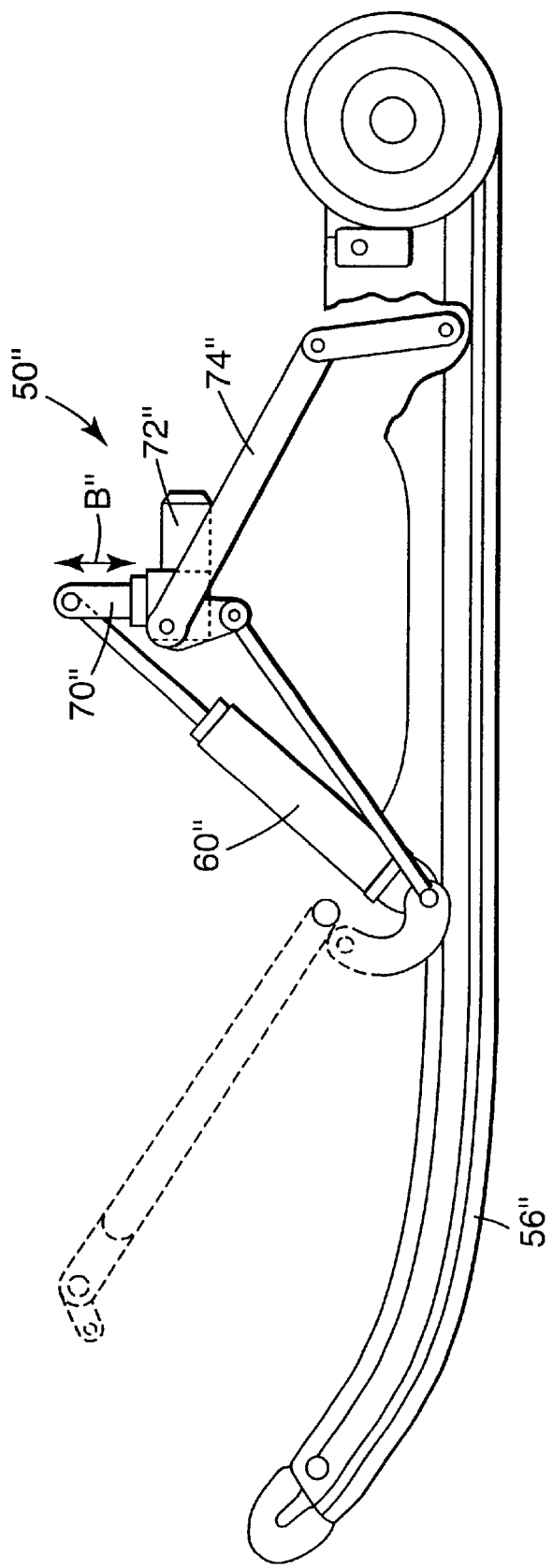
FIG. 4 is a schematic illustration of a second alternative snowmobile suspension system according to the present invention.

FIG. 4 is a schematic illustration of an alternate snowmobile suspension system 50" according to the present invention. A biasing/dampening mechanism 60" is attached either directly or via a linkage system to a slide rail 56" at one end and an actuator arm 70" at the other end. The actuator 72" is preferably rigidly attached to the suspension arm 74". The actuator arm extends and retracts along an axis B" in response to the control electronics 92. When the actuator arm 70" is moved to the retracted position toward the actuator 72', the speed and displacement of the biasing/dampening mechanism 60' is reduced, resulting in a lower motion ratio. Correspondingly, as the actuator arm 70" is extended away from the actuator 72", the speed and displacement of the biasing/dampening mechanism 60" is increased, corresponding to a higher motion ratio.

Figure 5:
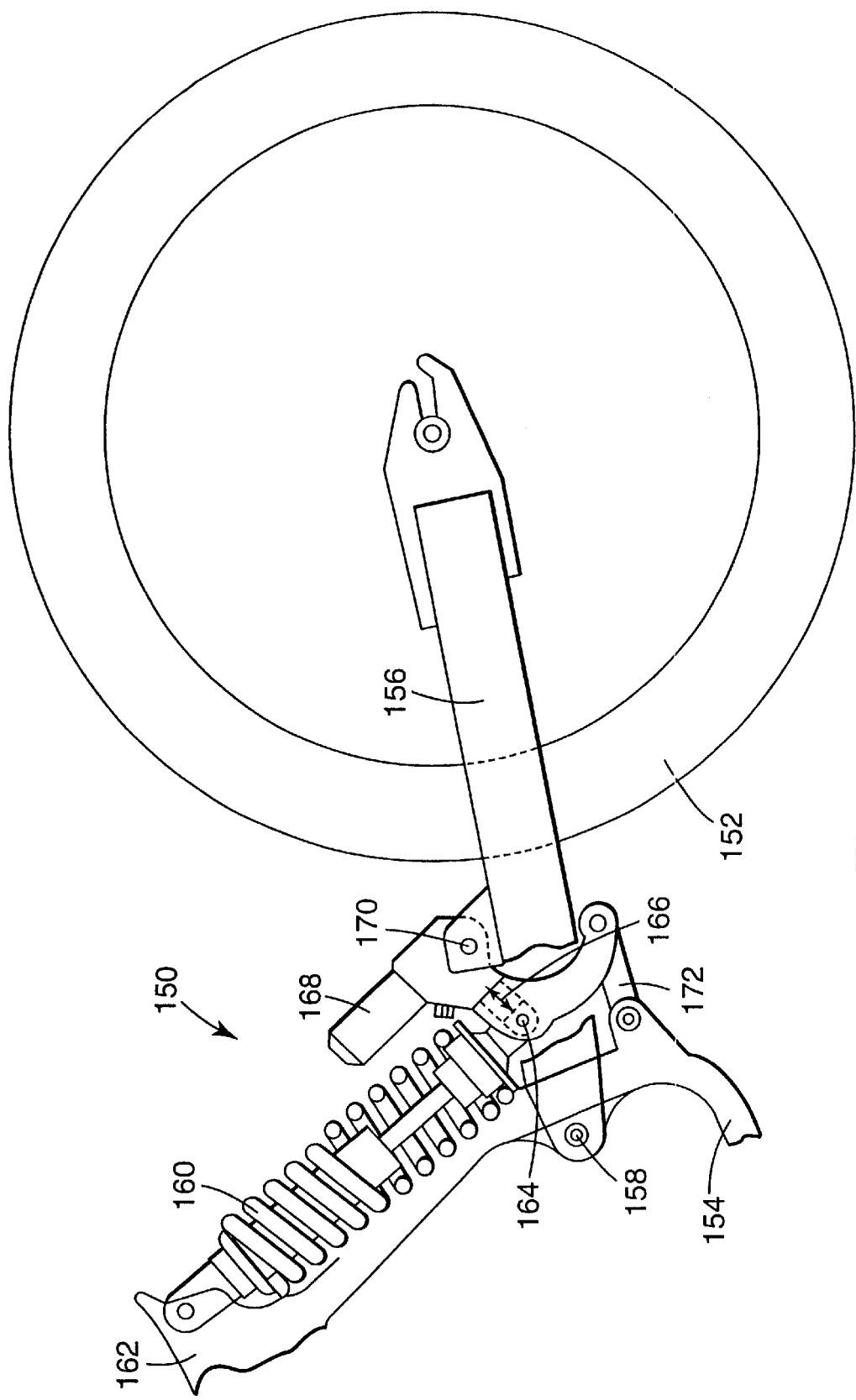
FIG. 5 is a schematic illustration of a suspension system according to the present invention for use on a motorcycle or bicycle.

FIG. 5 is a schematic illustration of a suspension system 150 according to the present invention for use on a motorcycle or bicycle. The rear wheel 152 of the motorcycle is pivotally mounted to the frame 154 by frame member or swing arm 156. The frame member 156 is attached to the frame 150 at pivoting joint 158. The frame member 156 is biased downward by a biasing/dampening mechanism 160 which is pivotally attached to an upper portion of the frame at a location 162. The lower portion of the biasing/dampening mechanism 160 is pivotally attached to an actuator arm 164 that can be displaced along an axis 166 by an actuator 168. In the embodiment of FIG. 5, the actuator 168 is pivotally mounted to the frame member 156 at a location 170. The position of the actuator 168 relative to the frame 154 is maintained by linkage 172. Locating the actuator 168 on the swing arm 156 provides a greater variation in the mechanical advantage and greater change in the motion ratio than locating it proximate the location 162. When the actuator arm 164 is retracted, the speed and displacement of the biasing/dampening mechanism 160 is reduced, resulting in a lower motion ratio and a softer ride. Correspondingly, as the actuator arm 164 is extended, the speed and displacement of the biasing/dampening mechanism 160 is increased, resulting in a higher motion ratio and a stiffer ride.

Figure 6:
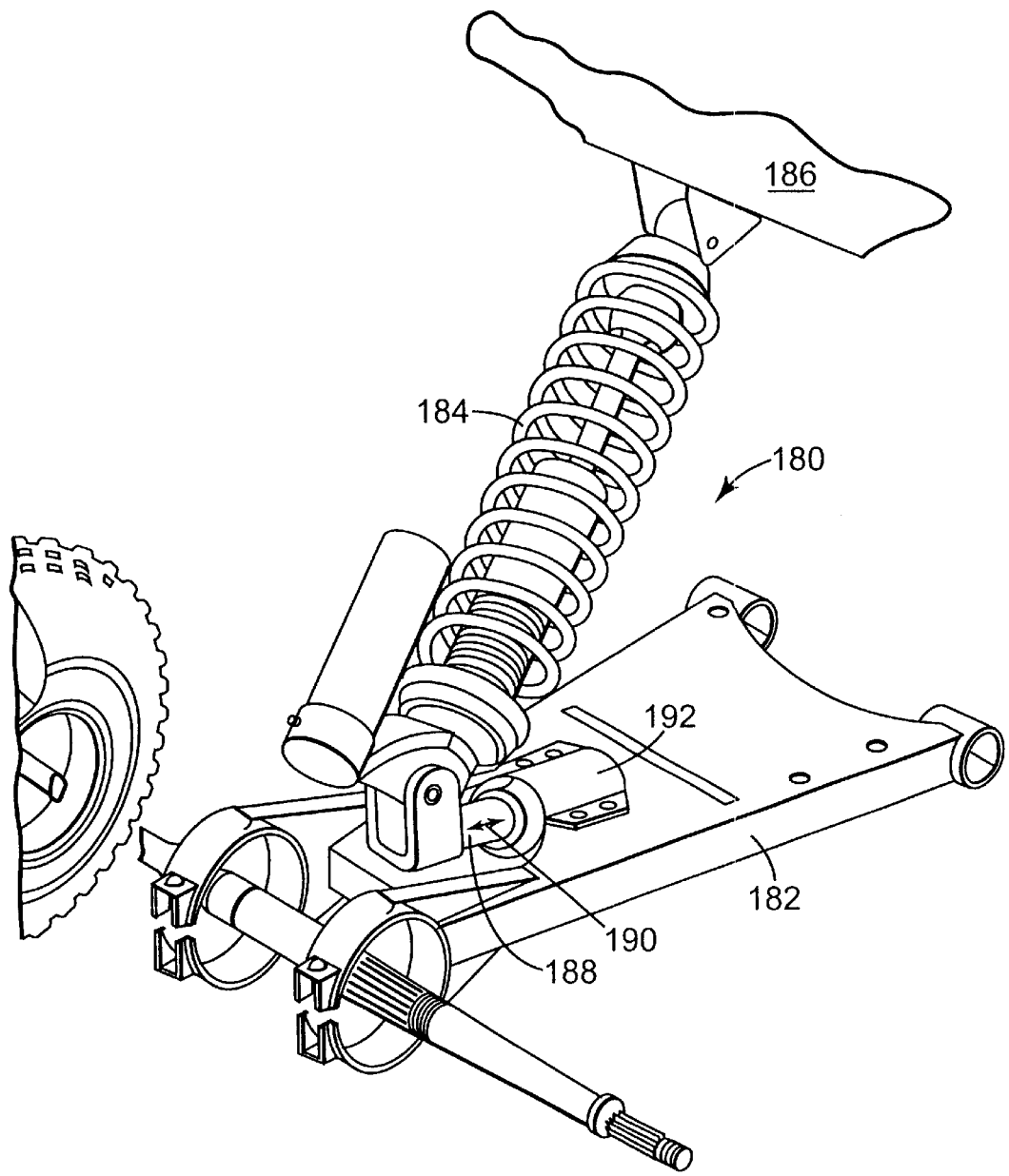
FIG. 6 is a perspective view of a suspension system according to the present invention for use on an all terrain vehicle.

FIG. 6 is a perspective view of an exemplary suspension system 180 suitable for use in an all terrain vehicle (not shown). A swing arm or suspension member 182 is biased downwards away from the vehicle chassis 186 by a biasing/dampening mechanism 184. The biasing/dampening mechanism 184 is pivotally mounted to the chassis 186 at one end and to an actuator arm 188 on an actuator 192 at the other end. The actuator 192 is preferably rigidly mounted to the swing arm 182. The actuator arm 188 may be displaced along an axis 190 so as to change the speed and displacement of the biasing/dampening mechanism 184. Locating the actuator 192 on the swing arm 182 provides a greater change in the mechanical advantage and a greater change in the motion ratio than locating it proximate the location 186.

The present suspension system requires considerable power to alter the motion ratio during operation of the vehicle. While it would be possible to design an electric power source or other power source on a recreational vehicle with adequate capacity to operate the present suspension system or other components requiring considerable power such as a fuel injection system without a battery, retrofitting the present suspension system to an existing vehicle has proven somewhat problematic. For example, snowmobiles typically utilize a magneto for generating electric power for the lights, heaters, and ignition system. The magneto generates between about 20 volts AC during idling to 80 volts AC at high RPMs at about 3–10 amps.

Figure 7:
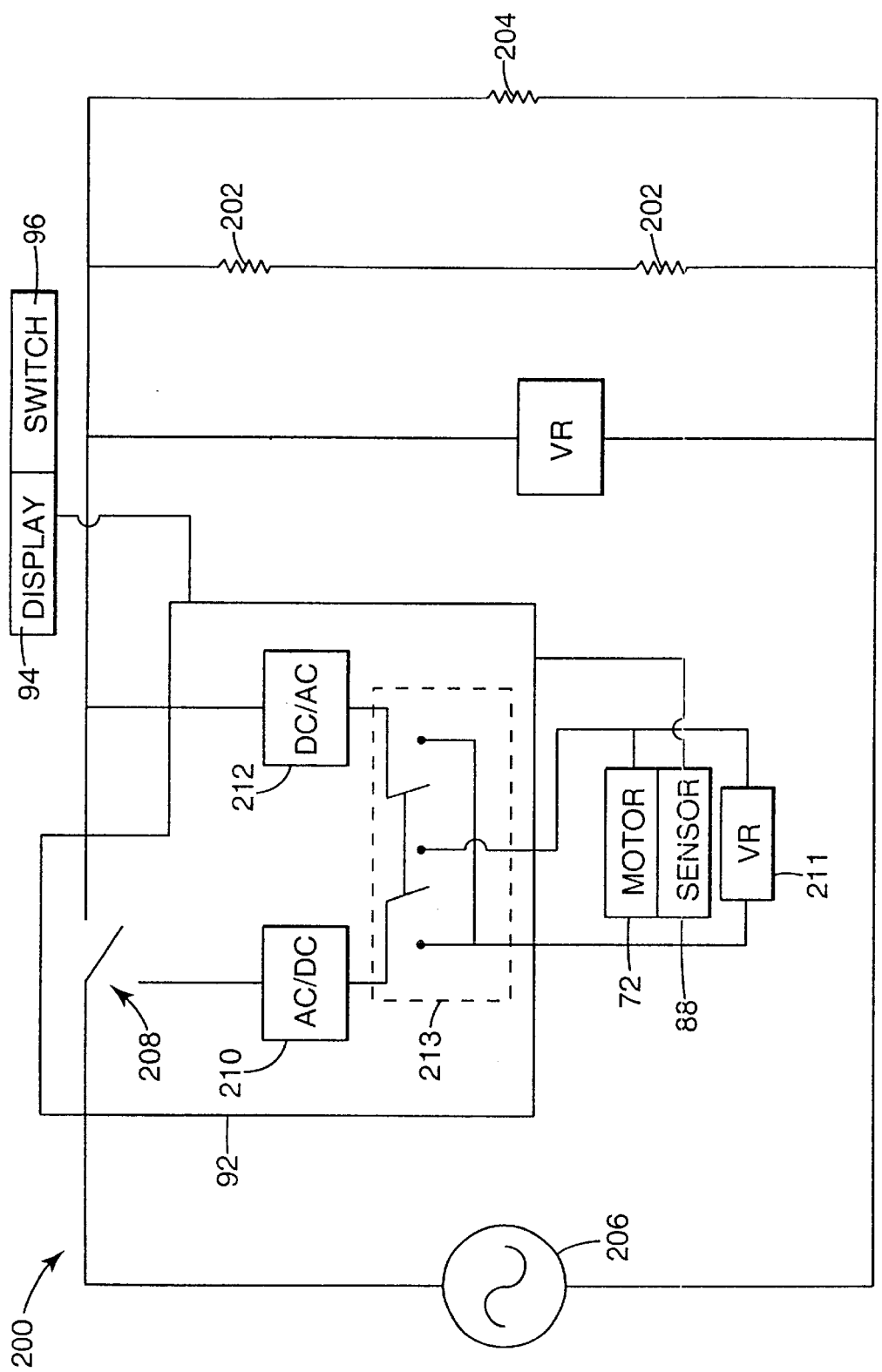
FIG. 7 is a schematic illustration of the control mechanism for the present suspension system.

FIG. 7 is a schematic illustration of one approach to maximizing the power output from the magneto on an existing recreational vehicle. Rather than powering the motor 72 of the present vehicle suspension system 50 in parallel with the heaters 202 and lights 204 of the vehicle, motor 72 is arranged in series upstream of the electrical components on the vehicle to receive raw power directly from the magneto 206 before power is provided to the other electrical components on the vehicle.

When the rider engages the switch 96, the controller 92 activates a toggle switch 208 to divert alternating current directly from the recreational vehicle's magneto/electric generator 206. The alternating current is converted to DC current in an A-to-D converter 210. The direct current is routed through a directional relay 213 in parallel with a voltage regulator 211 to the motor 72 to operate the motor at about 18 $V_{DC}$. The relay 213 switches the motor 72 in and out with the standard electrical system on the vehicle. A capacitor in the range of about 1500 $\mu$F is provided in the motor to reduce voltage fluctuations. The remaining current is then converted back to AC by a D-to-A converter 212 and directed to supply the rest of the vehicle's electrical requirements. By prioritizing power distribution, 18 $V_{DC}$ at 8 amps is available to the motor 72 from a system that typically provide only 12 $V_{AC}$. The present method and apparatus for diverting power directly from the vehicle's electrical system makes it possible to power other components, such as fuel injection systems using existing power sources.

The motor 72 drives the actuator arm in the chosen direction to vary the motion ratio of the suspension system. The controller 92 continues to direct power to the motor 72 until the detector 88 indicates the desired motion ratio has been attained or the actuator arm 70 has stopped moving for some period of time. When the controller 92 deactivates the motor 72, power from the magneto 206 is redirected to the recreational vehicle's normal electrical system by switch 208.

EXAMPLE

Figure 9:
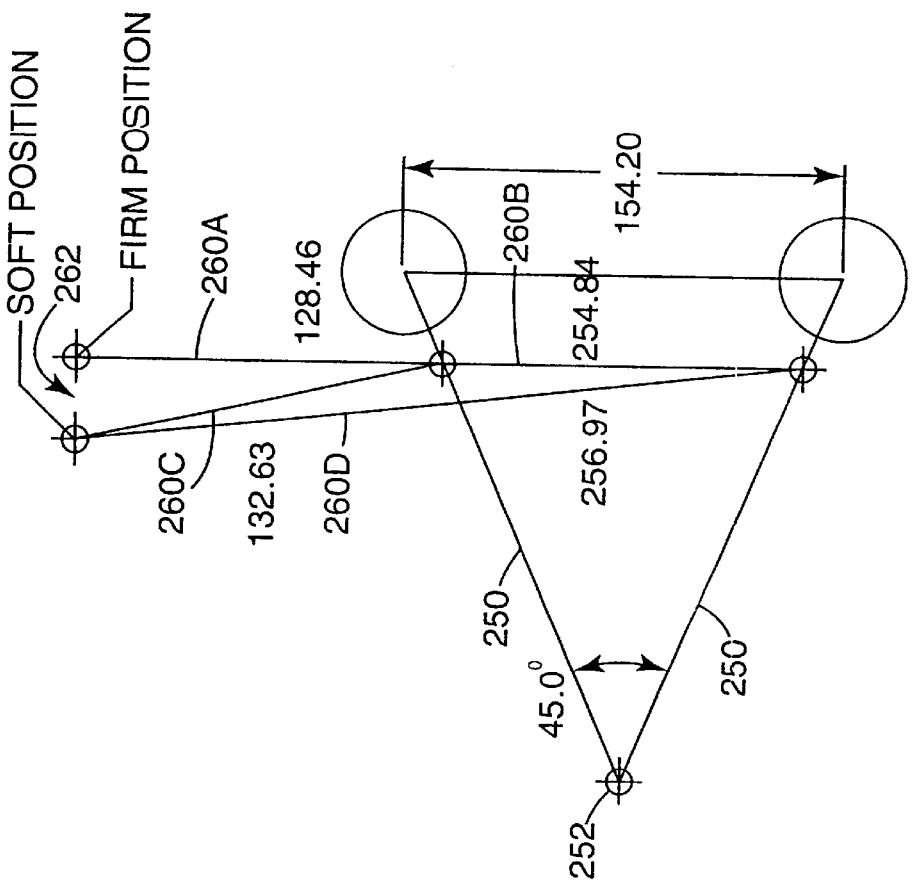
FIG. 9 is an idealized illustration of the motion ratio of a suspension system in which the biasing/dampening mechanism is displaced along the vehicle chassis.
Figure 8:
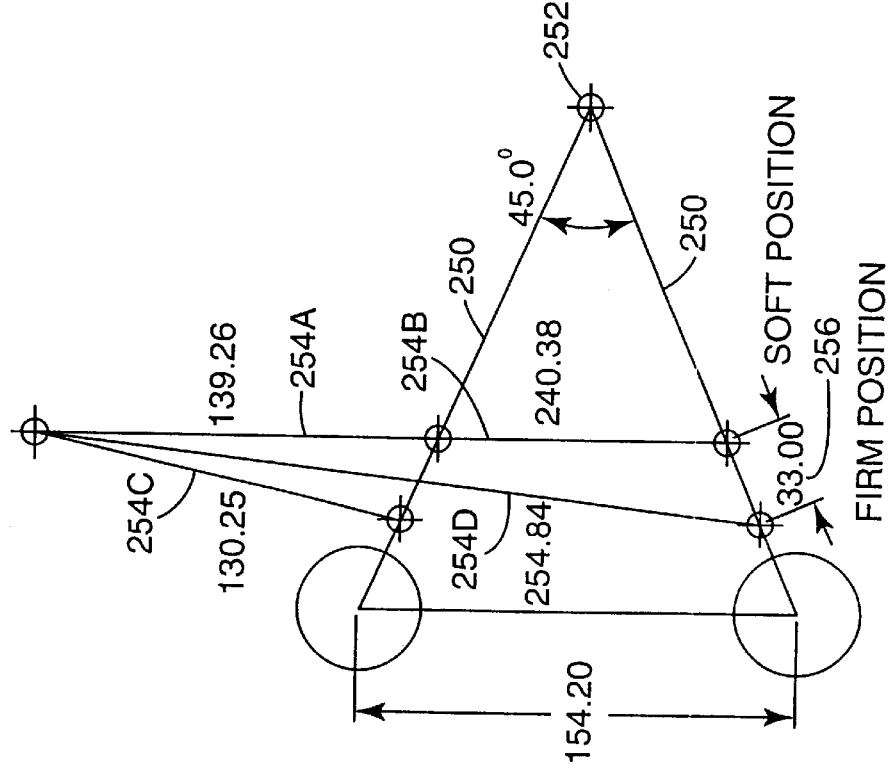
FIG. 8 is an idealized illustration of the motion ratio of the present suspension system.

FIGS. 8 and 9 show idealized suspension systems to schematically illustrate the advantage of locating the actuator on the moving frame member or swing arm, rather than on the fixed frame or chassis of the vehicle. For purposes of the illustration, the swing arms had a length of 201.5 mm. The swing arm 250 is permitted to pivot about location 252 through an arc of 45°; 22.5° above and below horizontal, corresponding to a suspension travel distance of 154.2 mm. The active end of the biasing/dampening mechanism 254 was displaced 33 mm from vertical. For purposes of this analysis, the active end of the biasing/dampening mechanism is at location zero when in the vertical configuration and at 33 mm when fully displaced. Motion ratio was defined as the displacement of the biasing/dampening mechanism/ total displacement of the suspension system.

FIG. 8 is a schematic illustration of an exemplary motion ratio for a suspension system according to the present invention. The displacement of the biasing/dampening mechanism takes place along segment 256 of the moving portion of the suspension system, in this case, along the swing arm 250. When the biasing/dampening mechanism is in a vertical configuration, the compressed length 254A of the biasing/dampening mechanism is about 139.26 mm and the extended length 254B of the biasing/dampening mechanism is about 240.38 mm. At a displacement of 33 mm from vertical, the compressed length 254C of the biasing/dampening mechanism is about 130.25 mm and the extended length 254D of the biasing/dampening mechanism is about 254.84 mm.

The motion ratio for the vertical configuration (soft ride) was calculated at about 65.5 ((240.38−139.26)/154.2=65.5). The motion ratio for the displaced configuration (firm ride) was calculated at about 80.7 ((254.84−130.25)/154.2=80.7). The percentage change of the motion ratio as a result of 33 mm of displacement along the swing arm 250 was about 23%.

FIG. 9 is a schematic illustration of a suspension system in which the biasing/dampening mechanism 260 is displaced along segment 262 on the chassis or frame of the vehicle, rather than on the swing arm 250. When in a vertical configuration, the compressed length 260A of the biasing/dampening mechanism is about 128.46 mm and the extended length 260B is about 254.84 mm. At a displacement of 33 mm from vertical, the compressed length 260C of the biasing/dampening mechanism is about 132.63 mm and the extended length 254D is about 256.97 mm.

The motion ratio for the vertical or firm configuration was calculated at about 81.9 ((254.84−128.46)/154.2=81.9). The motion ratio for the displaced or soft configuration was calculated at about 80.8 ((256.97−132.63)/154.2=80.8). The percentage change of the motion ratio as a result of 33 mm of displacement along the chassis was about 1.3%. Therefore, in spite of the risk of environmental contamination or damage, there is a significant advantage in locating the mechanism for displacing the biasing/dampening mechanism along the moving portion of the suspension system, such as on the swing arm.

Patents and patent applications disclosed herein, including those cited in the background of the invention, are hereby incorporated by reference. Other embodiments of the invention are possible. It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A vehicle suspension system with variable geometry adapted to be suspended beneath a vehicle, comprising:
    a rigid suspension arm pivotally attached to a vehicle chassis;
    a biasing/dampening mechanism having a first end operatively attached to the chassis and a second end;
    a hydraulic actuator mechanism operatively connecting the second end of the biasing/dampening mechanism to the rigid suspension arm, the actuator mechanism capable of moving the second end along at least one axis when the vehicle is in a dynamic mode to alter the motion ratio of the vehicle suspension system; and
    a control mechanism for activating the actuator mechanism, wherein the actuator mechanism is intermittently connected in series with an electric power source on the vehicle.

2. The apparatus of claim 1 wherein the actuator mechanism is capable of increasing or decreasing the motion ratio of the displacement of the biasing/dampening mechanism to a total displacement of the suspension system relative to the chassis.

3. The apparatus of claim 1 wherein the actuator mechanism is pivotally connected to the moveable suspension arm.

4. The apparatus of claim 1 wherein the actuator mechanism is operatively connected to the second end of the biasing/dampening mechanism by a rocker arm and a pull rod.

5. The apparatus of claim 1 wherein the biasing/dampening mechanism comprises a shock absorber.

6. The apparatus of claim 1 wherein the biasing/dampening mechanism comprises a spring.

7. The apparatus of claim 1 wherein the biasing/dampening mechanism comprises a shock absorber and a spring.

8. The apparatus of claim 1 comprising a sensor capable of measuring the location of the second end of the biasing/dampening mechanism.

9. The apparatus of claim 1 comprising a display capable of indicating the location of the second end of the biasing/dampening mechanism.

10. The apparatus of claim 1 wherein the vehicle is selected from a group consisting of snowmobiles, all-terrain vehicles, bicycle, and motor cycles.

11. A suspension system with variable geometry for suspending an endless track beneath a tracked vehicle, the suspension assembly having an elongated slide rail with a bottom track engaging portion defining a longitudinal axis, at least one rigid suspension arm pivotally connecting the vehicle chassis with the slide rail, and a biasing/dampening mechanism for urging the slide rail away from the vehicle chassis, the biasing/dampening mechanism having an first end operatively connected to the vehicle chassis at a first location and a second end operatively connected to the slide rail at a second location, the suspension system comprising:
    a hydraulic actuator mechanism operatively connecting one of the first end or second end of the biasing/dampening mechanism to the tracked vehicle, the hydraulic actuator mechanism being operative to move the first end or second end along at least one axis when the vehicle is in a dynamic mode to alter the displacement of the biasing/dampening mechanism to a total displacement of the slide rail relative to the chassis; and
    a control mechanism for activating the actuator mechanism, wherein the actuator mechanism is intermittently connected with an electric power source on the tracked vehicle.

12. The apparatus of claim 11 wherein the actuator mechanism is capable of increasing or decreasing the motion ratio of the displacement of the biasing/dampening mechanism to a total displacement of the suspension system relative to the chassis.

13. The apparatus of claim 11 wherein the actuator mechanism is pivotally connected to the moveable suspension arm.

14. The apparatus of claim 11 wherein the actuator mechanism is operatively connected to the second end of the biasing/dampening mechanism by a rocker arm and a pull rod.

15. The apparatus of claim 11 wherein the biasing/dampening mechanism comprises a shock absorber.

16. The apparatus of claim 11 wherein the biasing/dampening mechanism comprises a spring.

17. The apparatus of claim 11 wherein the biasing/dampening mechanism comprises a shock absorber and a spring.

18. The apparatus of claim 11 comprising a sensor capable of measuring the location of the second end of the biasing/dampening mechanism.

19. The apparatus of claim 11 comprising a display capable of indicating the location of the second end of the biasing/dampening mechanism.

20. The apparatus of claim 11 comprising suspension arm regulating movement of the slide rail relative to the vehicle chassis.

21. The apparatus of claim 20 composing suspension arm comprises a slot mechanism to permit sliding engagement between the slide rail and the suspension arm.

22. The apparatus of claim 11 wherein the suspension arm comprises a front arm and a rear suspension arm of generally equal length.

23. The apparatus of claim 11 wherein the biasing/dampening mechanism comprises a coil spring concentrically disposed about a shock absorber.

24. A suspension system with variable geometry for suspending an endless track beneath a tracked vehicle, the suspension assembly having an elongated slide rail with a bottom track engaging portion defining a longitudinal axis, at least one rigid suspension arm pivotally connecting the vehicle chassis with the slide rail, and a biasing/dampening mechanism for urging the slide rail away from the vehicle chassis, the biasing/dampening mechanism having a first end operatively connected to the vehicle chassis and a second end, the suspension system comprising:

a hydraulic actuator mechanism mounted on the slide rail and operatively connecting the second end of the biasing/dampening mechanism to the slide rail, the actuator mechanism being capable of moving the second end along at least one axis when the vehicle is in a dynamic mode to alter the displacement of the biasing/dampening mechanism relative to a total displacement of the slide rail relative to the chassis; and a control mechanism for activating the actuator mechanism.

25. A suspension system with variable geometry for suspending an endless track beneath a tracked vehicle, the suspension assembly having an elongated slide rail with a bottom track engaging portion defining a longitudinal axis, at least one rigid suspension arm pivotally connecting the vehicle chassis with the slide rail, and a biasing/dampening mechanism for urging the slide rail away from the vehicle chassis, the biasing/dampening mechanism having a first end operatively connected to the slide rail and a second end, the suspension system comprising:

a hydraulic actuator mechanism mounted to the vehicle chassis and operatively connecting the second end of the biasing/dampening mechanism to the vehicle chassis, the actuator mechanism being capable of moving the second end along an axis when the vehicle is in a dynamic mode to alter the displacement of the biasing/dampening mechanism relative to a total displacement of the slide rail relative to the chassis; and a control mechanism for remotely activating the actuator mechanism.

26. A method for adjusting the geometry of a suspension system for suspending an endless track beneath a tracked vehicle, the suspension assembly having an elongated slide rail with a bottom track engaging portion defining a longitudinal axis, at least one rigid suspension arm pivotally connecting the vehicle chassis with the slide rail, and a biasing/dampening mechanism for urging the slide rail away from the vehicle chassis, the biasing/dampening mechanism having a first end operatively connected to the vehicle chassis and a second end, the method comprising the steps of:

pivotally attaching a moveable suspension arm to a vehicle chassis;

applying a biasing force between the chassis and a first location on the moveable suspension arm using a biasing/dampening mechanism;

connecting a hydraulic actuator mechanism to an electrical system on the vehicle, and signaling a control mechanism to activate the actuator mechanism when the vehicle is in a dynamic mode, whereby the location where the biasing force engages with the moveable suspension arm is displaced to a second location and the motion ratio of the suspension system is altered.

* * * * *

UNITED STATES PATENT AND TRADEMARK OFFICE
CERTIFICATE OF CORRECTION

PATENT NO. : 6,237,706 B1
DATED : May 29, 2001
INVENTOR(S) : Gerard J. Karpik et al.

It is certified that error appears in the above-identified patent and that said Letters Patent is hereby corrected as shown below:

Title page,
Item [63], delete "May 6, 1997" and replace it with -- May 9, 1997 --.

Signed and Sealed this

Fifteenth Day of January, 2002

Attest:

Attesting Officer

JAMES E. ROGAN
Director of the United States Patent and Trademark Office